United States Patent
Hammer et al.

[15] 3,691,443
[45] Sept. 12, 1972

[54] WINDSHIELD WIPER MECHANISM

[72] Inventors: Dale F. Hammer, Bellbrook; Leo E. Bischoff, Centerville, both of Ohio

[73] Assignee: General Motors Corporation, Detroit, Mich.

[22] Filed: Sept. 1, 1971

[21] Appl. No.: 176,824

[52] U.S. Cl. ................... 318/443, 318/DIG. 2, 74/70
[51] Int. Cl. ............................................. H02p 3/00
[58] Field of Search ............... 318/DIG. 2, 443; 74/70

[56] References Cited

UNITED STATES PATENTS

| | | |
|---|---|---|
| 2,959,968 | 11/1960 | Gute et al. ............ 318/DIG. 2 |
| 3,091,128 | 5/1963 | Rees et al. ............ 318/DIG. 2 |
| 3,253,206 | 5/1966 | Romanowski ......... 318/472 X |
| 3,262,038 | 7/1966 | Smith .................... 318/DIG. 2 |

*Primary Examiner*—Benjamin Dobeck
*Attorney*—W. E. Finken et al.

[57] ABSTRACT

This disclosure relates to an actuating mechanism for oscillating a windshield wiper through an outboard and inboard stroke during each cycle of operation during running operation and for moving the wiper to a depressed park position when wiper operation is being terminated. The actuating mechanism includes an electric motor, an energizing circuit for the electric motor including a park switch and a momentarily depressible manual on and off switch, a rotatable driving member connected with the motor, a variable throw crank means eccentrically journaled within the driving member and a coupling means for drivingly interconnecting the crank means to the driving member during running operation to oscillate the wipers through its cycle of operation and for disconnecting the driving connection therebetween to effect an increase in the throw of the crank means to move the wiper to the depressed park position when wiper operation is being terminated. The coupling means includes a drive pawl having an upstanding lug and a latch supported for limited universal movement and which is biased toward a first position for intercepting the lug of the drive pawl to effect interruption of the driving connection between the crank means and the driving means to substantially arrest rotation of the crank means whereby continued rotation of the driving member will vary the throw of the crank means which in turn will move the latch means to open the park switch to de-energize the wiper motor when the throw of the crank means is substantially a maximum. The electric motor is energized by a relay means which is operable to move the latch laterally to a position where it is disengaged from the lug of the drive pawl and releases the park switch for movement to its closed position. When the manual on-off switch is momentarily depressed and then released a latch retarding means engages the latch to retard the movement of the latter towards its first position as the lug of the pawl is being disengaged therefrom whereby energization of the wiper motor through a single cycle of operation is assured.

3 Claims, 15 Drawing Figures

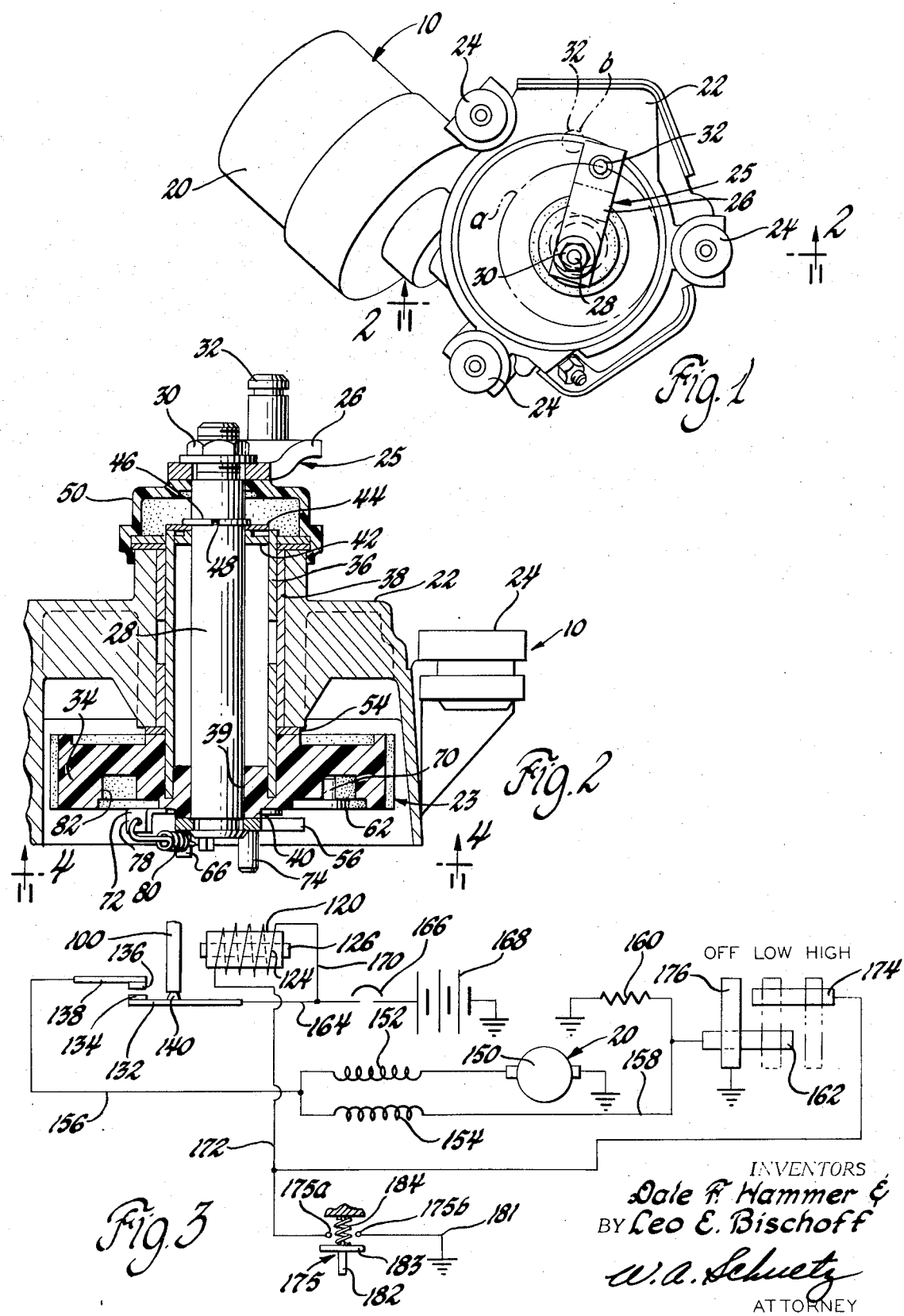

INVENTORS
Dale F. Hammer &
BY Leo E. Bischoff

W. A. Schutz
ATTORNEY

PATENTED SEP 12 1972
3,691,443
SHEET 3 OF 3
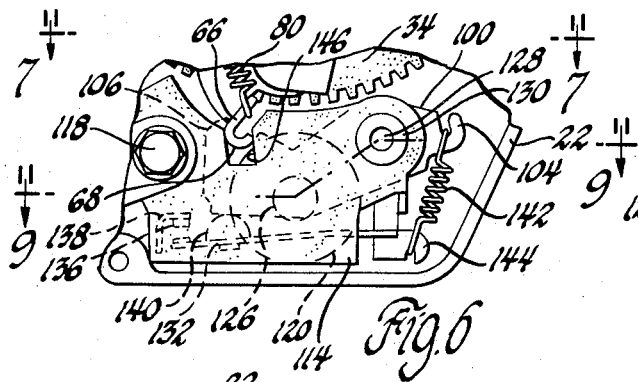
Fig.6
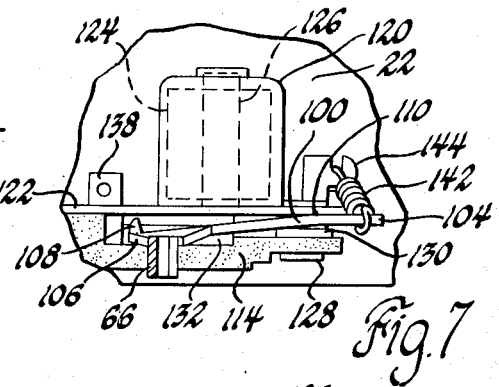
Fig.7
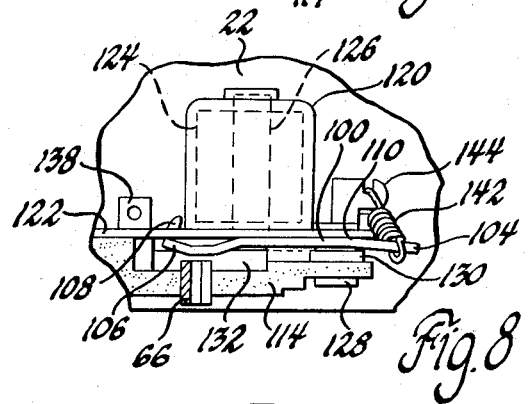
Fig.8
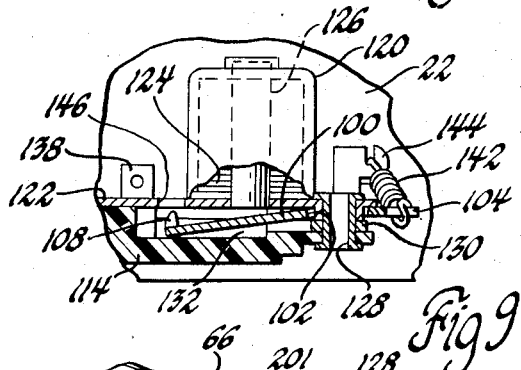
Fig.9
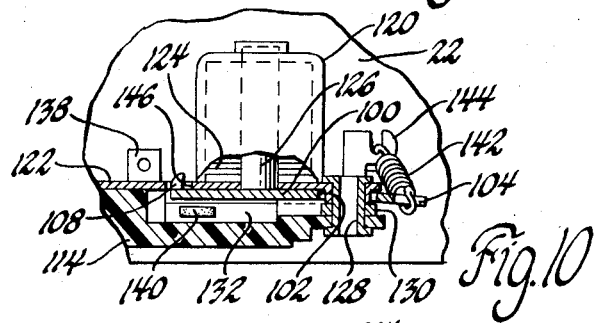
Fig.10
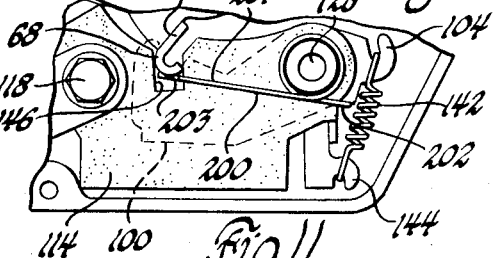
Fig.11
Fig.12
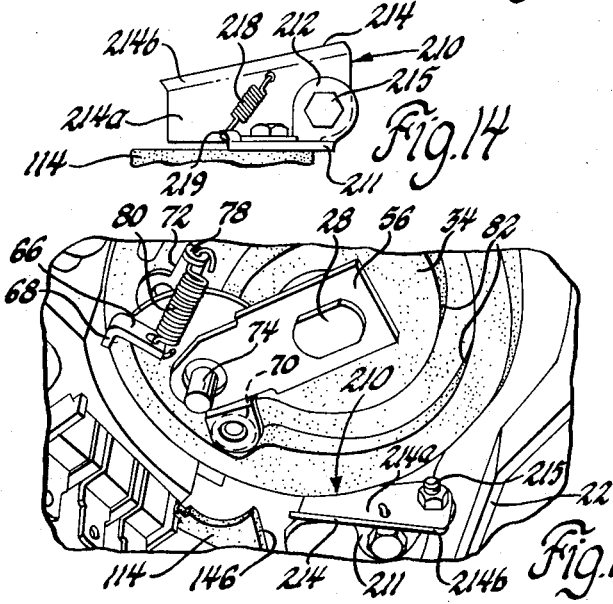
Fig.14
Fig.15
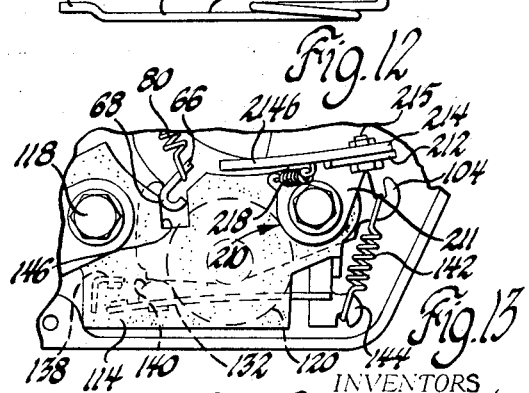
Fig.13
INVENTORS
Dale F. Hammer &
BY Leo E. Bischoff
W. A. Schuetz
ATTORNEY

WINDSHIELD WIPER MECHANISM

The present invention relates to a windshield wiper actuating mechanism, and in particular to a windshield wiper actuating mechanism for oscillating a windshield wiper between inboard and outboard strokes during running operation and for moving the windshield wiper to a depressed park position spaced from the inboard stroke end when wiper operation is being terminated.

One type of windshield wiper actuating mechanism for oscillating a windshield wiper between inboard and outboard positions during running operation and for moving the wipers to a depressed park position when wiper operation is being terminated is shown in Romanowski U.S. Pat. No. 3,253,206. This wiper actuating mechanism included a unidirectional electric motor having an electromagnetically closed, mechanically opened parking switch in the energizing circuit for the motor. The mechanism further included a rotatable drive gear connected with the motor, a variable throw crank assembly eccentrically journaled within the drive gear and a coupling or control means for drivingly interconnecting the crank means and the driving member during running operation to rotate the crank assembly about a given orbit to effect oscillation of the wiper between its inboard and outboard positions and for disconnecting the driving connection therebetween and eccentrically shifting the crank assembly to increase the throw of the variable crank means to effect movement of the wiper from its inboard position toward its park position when wiper operation is being terminated.

The control or coupling means included a drive pawl having an upstanding lug and which is operatively connected with the variable throw crank assembly, a latch supported in the switch housing for the park switch for limited universal movement and a spring for biasing the latch toward a first position in which it will intercept the lug on the drive pawl to effect an interruption of the driving connection between the crank assembly and the driving member to substantially arrest rotation of the crank assembly whereby continued rotation of the driving member will eccentrically shift the crank assembly to vary the throw of the crank means to move the wiper to its park position. The drive pawl moves the latch toward a second position during the variation of the throw of the crank assembly to deflect a movable contact of the park switch to an open position to de-energize the wiper motor when the throw of the crank assembly is substantially a maximum.

Operation of the electric motor is controlled by a manual on-off switch which when moved to an on position energizes a relay to effect movement of the latch laterally thereof to a third position wherein it is disengaged from the lug of the drive pawl and in which it releases the movable contact of the park switch to permit closure of the same and thereby effect energization of the wiper motor and a subsequent re-establishment of the driving connection between the drive pawl and the driving member. The latch remains in its third position all the time the wipers are operating, since the relay is energized while the wipers are operating. When the on-off switch is moved toward an off position, the relay is de-energized to enable the latch to be moved toward its first position in which it will interrupt the drive pawl.

This type of wiper actuating mechanism has also been used in conjunction with the momentarily depressible on-off switch to effect a single cycle of operation of the wiper motor upon the switch being momentarily depressed. A problem which arises, however, when using such a momentarily depressible on-off switch is that the relay for moving the latch toward its third position may not be energized long enough to allow the pawl to be disengaged from the latch. Thus, if the switch were depressed and released too quickly the latch would re-engage the drive lug on the drive pawl and effect opening movement of the park switch. To overcome this problem, a holding relay was heretofore provided. The circuit for the holding relay was completed upon momentary depression of the on-off switch and provided a by-pass circuit around the park switch to keep the motor energized for a sufficient length of time to enable the drive pawl to completely disengage from the latch prior to a cam operated switch de-energizing the holding relay.

In accordance with the provisions of the present invention a latch retarding means is provided to retard the movement of the latch towards its first position to enable the pawl to become disengaged from the latch upon momentary depression of the on-off switch. The latch retarding means eliminates the need for the heretofore used holding relay and the cam operated switch for subsequently de-energizing the holding relay. Advantages of the latch retarding means are that it is of a simpler and more economical construction than the holding relay and cam operated switch.

Accordingly, an important object of the present invention is to provide a new and improved windshield wiper actuating mechanism of the type defined above and in which a latch retarding means is provided to engage the latch to retard the movement of the latch toward its first position as the lug on the pawl is being disengaged therefrom upon the relay being de-energized when the manual on-off switch is released after being momentarily depressed for an instant whereby energization of the wiper motor for a single cycle of wiper operation is assured.

Another object of the present invention is to provide a new and improved windshield wiper actuating mechanism, as defined in the preceding object, and in which the latch retarding means is a spring having one end engageable with the latch and its other end engageable with the drive pawl and which is constructed and arranged such that it exerts a biasing force on the latch until the pawl is assured of disengagement from the latch and thereafter allows the latch to be moved toward its first position.

A still further object of the present invention is to provide a new and improved windshield wiper actuating mechanism, as defined in the penultimate object, and in which the latch retarding means is a pivotally supported trip member which is biased toward a position in which it is disposed between the latch and the drive member and which is adapted to be moved or tripped by the pawl toward a second position in which the latch is allowed to move toward its first position in which it will intercept the drive pawl to disconnect the driving connection between the drive member and the variable throw crank assembly.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is an elevational view of a windshield wiping actuating mechanism embodying the present invention;

FIG. 2 is an enlarged fragmentary sectional view taken approximately along line 2—2 of FIG. 1;

FIG. 3 is a schematic wiring diagram for controlling operation of the windshield wiper actuating mechanism shown in FIG. 1;

FIG. 6 is a fragmentary view similar to that shown in FIG. 5, but showing different parts thereof in different positions;

FIG. 7 is a fragmentary view, with parts shown in section and parts in elevation, and taken approximately along line 7—7 of FIG. 6;

FIG. 8 is a view similar to FIG. 7 but showing different parts thereof in different positions;

FIG. 9 is a fragmentary sectional view taken approximately along line 9—9 of FIG. 6 and showing parts thereof in section and parts thereof in elevation;

FIG. 10 is a view similar to FIG. 9, but showing different parts thereof in different positions;

FIG. 11 is a top plan view of part of the windshield wiper actuating mechanism of the present invention;

FIG. 12 is a side elevational view of part of the windshield wiper actuating mechanism of the present invention; and FIGS. 13–15 are views showing an alternative embodiment of the windshield wiper actuating mechanism of the present invention.

Figure 4:
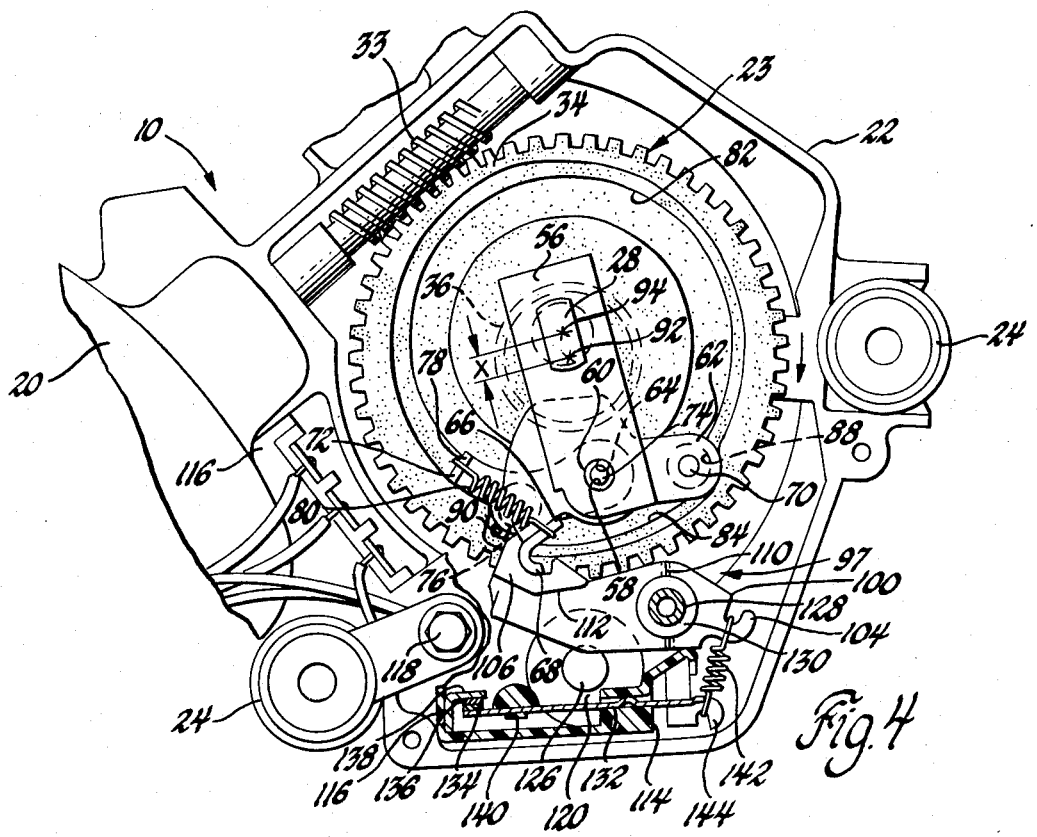
FIG. 4 is a fragmentary view, with parts shown in section and parts shown in elevation, taken approximately along line 4—4 of FIG. 2.

As representing a preferred embodiment of the present invention, the drawings show a windshield wiper actuating mechanism 10. The windshield wiper actuating mechanism 10 comprises a unidirectional direct current electric motor 20 having an end casting 22 which encloses a worm and worm gear reduction unit 23 and a variable throw crank assembly 25. The end casting, or housing 22, includes three gromet supports 24 by which the wiper actuating mechanism can be attached to a support within a motor vehicle (not shown). The crank assembly 25 includes a rotary crank arm 26 attached to a shaft 28 by a lock nut 30 and having a crank pin 32 adjacent its outer end. During running operation of the wiper actuating mechanism the crank pin 32 rotates in an orbit indicated by the broken line a to effect oscillation of a pair of windshield wipers (not shown) between inboard and outboard positions, while during parking operation the crank pin 32 is moved radially outwardly to the position b, as shown in FIG. 1. This increase in the throw or effective radius of the crank arm 26 from the running orbit a to the park position b is sufficient to move the wipers beyond their inboard stroke ends to a depressed park position adjacent the lower edge of the windshield of the vehicle (not shown).

Referring to FIG. 2, the worm gear speed reduction unit 23 includes a worm 33 integral with the armature shaft (not shown) of the motor 20 that meshes with a nylon worm gear 34. The worm gear 34 is suitably interlocked with a hollow metallic hub 36 journaled by spaced sleeve bearings 38 in the housing 22. The hub 36 is concentric with the axis of the worm gear 34, and the worm gear has an offset, or eccentric bore 39 formed therein for receiving the shaft 28. The face of the worm gear 34 has a shoulder 40 coaxial with the eccentric bore 39 as seen in FIG. 2, and one end of the shaft 28 is journaled within the bore 39. The other end of the shaft 28 extends through an apertured shield 42 interlocked with diametrically opposed notches on the hub sleeve 36, the shield 42 being held in assembled relation with the hub sleeve 36 by one or more washers 44 and a snap ring 46 situated in an annular groove 48 of the crank shaft 28 and engaging the washer 44. As seen in FIG. 2, the upper end of a hollow hub 36 is enclosed by an elastomeric seal cap 50 which is suitably attached to the housing 22. A washer 52 is interposed between the shield 42 and the housing 22, and a washer 54 is interposed between the worm gear 34 and the housing 22.

Figure 5:
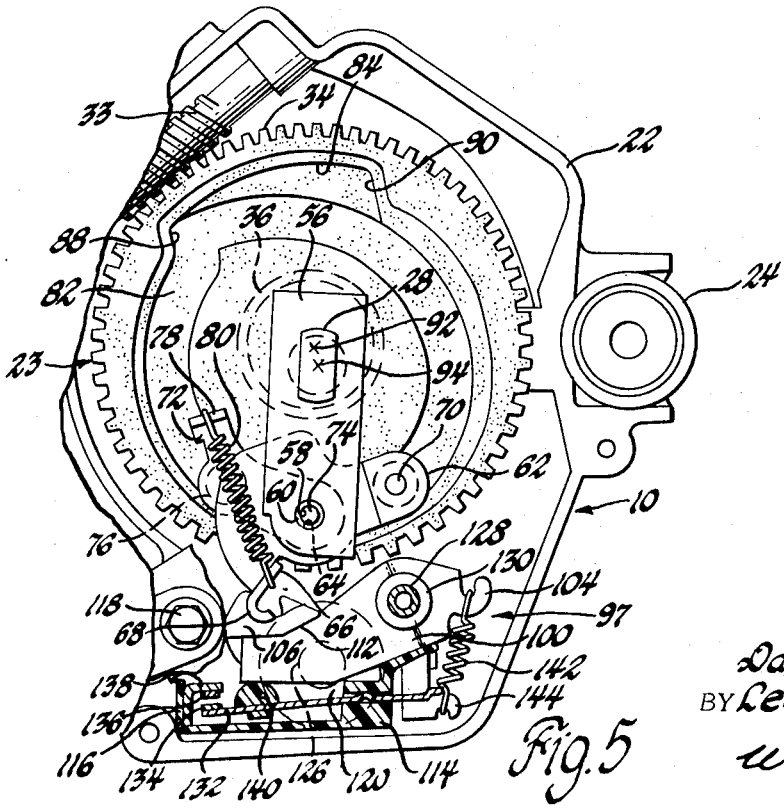
FIG. 5 is a fragmentary view similar to that shown in FIG. 4, but showing different parts thereof in different positions.

With reference to FIGS. 4 and 5, the interruptible driving connection between the shaft 28 and the worm gear 34 comprises a drive plate 56 rigidly attached to the end of the shaft 28 opposite the crank arm 26. The drive plate 56 has a circular opening 58 surrounded by a shoulder 60. A drive pawl 62 has a circular aperture 64 for receiving the shoulder 60 such that the drive pawl is rotatably journaled on the drive plate. In addition, the drive pawl 62 is formed with an integral, upstanding apertured lug 66 having a reversely bent end 68, and an integral cam follower pin 70. A lock pawl 72 has an upstanding pin 74 which extends through the aperture 64 in the drive pawl 62 and the aperture 58 in the drive plate 56 whereby the lock pawl 72 is pivotally supported relative to the drive plate 56. In addition, the lock pawl 72 has an integral cam follower pin 76 and an upstanding apertured lug 78. The lug 66 on the drive pawl 62 and the lug 78 on the hold pawl 72 are interconnected by a coil spring 80 which normally maintains the drive pawl and the lock pawl in the angular relationship depicted in FIG. 4.

The drive gear 34 has an integral cam track or slot 82 with a raised ledge or radially outwardly disposed section 84. The cam track 82 at the opposite ends of the section 84 defines a pair of angularly spaced shoulders, or abutments, 88 and 90. In assembling the crank shaft assembly with the drive gear as shown in FIG. 2 the drive pawl 62 is journaled on the shoulder 60 surrounding the aperture 58 on the drive plate 56. Thereafter, the lock pawl 72 is assembled with the drive plate 56 and the drive pawl 62 by inserting the pin 74 through the aligned apertures in the drive pawl and the drive plate. Thereafter, the lugs 66 and 78 are interconnected by the extension spring 80. This subassembly is then assembled with the gear 34 by inserting the crank shaft 28 through the bearing aperture 39 in the drive gear and moving the entire assembly axially relative to the gear until the cam follower pin 70 on the drive pawl 62 and pin 76 on the lock pawl 72 are seated within the cam slot 82. When the pin 70 is in engagement with the shoulder 88 on the cam follower and the pin 76 is in engagement with the shoulder 90, the shaft 28 is connected for rotation with the drive gear 34.

Referring to FIGS. 4 and 5, the worm gear 34 is shown in driving engagement with a worm 33 integral with the armature shaft of the motor 20. When the motor 20 is energized, the worm gear 34 rotates in the clockwise direction as indicated by the arrow. With the cam follower pin 70 of the drive pawl 62 in engagement with the shoulder 88 and the cam follower pin 76 of the lock pawl 72 in engagement with the shoulder 90, rotation will be imparted to the shaft 28 about the axis 92 of the worm gear 34. As clearly seen in FIG. 4, the axis 94 of the shaft 28 is offset, or spaced, from the axis of the worm gear by a distance X. As long as the drive and lock pawls are engaged with their respective shoulders of the worm gear, the throw of the crank assembly remains constant and the crank pin 32 of the crank arm 26, as shown in FIG. 1, moves in the circular orbit $a$.

In order to increase the throw of the crank arm 26 to move the wiper assemblies to a depressed parked position, it is necessary to interrupt the driving connection between the shaft 28 and the worm gear 34 during continued rotation of the worm gear 34. In so doing rotation of the shaft 28 is substantially arrested and continued rotation of the worm gear 34 throughout a distance of substantially 180° shifts the axis of the shaft 28 throughout twice the distance X, that is the twice the radial offset between the axis 94 of the shaft 28 and the axis 92 of the worm gear 34. In other words, the axis 94 of the shaft 28 is shifted from one side of the axis of the worm gear 34 to the other side thereof as shown in FIG. 5, this being accomplished by relative rotation between the worm gear 34 and the crank shaft 28 due to the eccentric relationship of these components. In order to interrupt the driving connection between the crank assembly 25 and the worm gear 34, a control mechanism 97 including a universally mounted latch 100 is provided.

Referring to FIGS. 4 and 7, the latch 100 which comprises a steel stamping, is formed with a substantially elliptical opening 102, a spring retaining lug 104, a hook 106 and a cam lug 108. The cam lug 108 is curved outwardly of the plane of the hook 106 as clearly shown in FIG. 7, and the function thereof will be pointed out more particularly hereinafter. As seen in FIGS. 4 and 7 the latch 100 is transversely bent along a line 110 through the center of the elliptical opening 102, and in addition the hook 106 is angularly offset along a line 112.

Referring to FIGS. 6 through 10, the latch 100 constitutes a component of an electromagnet and switch assembly for controlling the interruptible driving connection between the crank assembly 25 and the drive gear 34 and the energizing circuit for the motor 20. The electromagnet and switch assembly includes a plastic switch housing 114 which, as seen in FIG. 4, has an integral offset leg portion 116 on which terminals are mounted. The plastic housing 114 is attached to the housing 22 by a bolt 118. An electromagnet 120 including a steel shell 122, a coil 124 and a magnetizable core 126 is attached to the switch housing 114 by a hollow rivet 128 and the bolt 118. The latch 100 is mounted for limited universal movement on the hollow rivet 128 as seen in FIG. 9, a washer 130 being interposed between the switch housing 114 and the latch 100. By virtue of the elliptical opening 102 in the latch 100 through which the cylindrical rivet 128 passes, it will be appreciated that the latch is supported for limited lateral and axial movement as well as pivotal movement relative to the switch housing 114.

As seen more particularly in FIGS. 4 and 5, a parking switch is contained within the switch housing 114 comprising a movable leaf spring switch blade 132 carrying a contact 134 at its free end and a stationary contact 136 connected to a terminal lug 138. The leaf spring switch blade 132 carries a plastic button, or actuator 140, adjacent its contact carrying end, which button is engageable by the latch 100 to separate the contacts 134 and 136 so as to de-energize the motor 20 when the crank throw is substantially a maximum and the wipers are moved to their depressed parked positions as shown in FIG. 5. The latch 100 is biased in the clockwise direction about its pivotal connection with the switch housing by a coil spring 142, one end of which engages the lug 104 of the latch, and the other end of which engages a lug 144 integral with the shell 122 of the electromagnet. In addition to biasing the latch 100 in a clockwise direction, the spring 142 urges the latch 100 towards the switch housing 114 due to the angular relation between the lugs 144 and 104. That is, the lug 144 is located above the plane of the lug 104 on the latch as clearly shown in FIGS. 7 through 10.

The electromagnet 120 is energized in FIGS. 8 and 10, and de-energized in FIGS. 7 and 9. The latch 100, the drive pawl 62, and the parking switch are shown in the parked positions in FIG. 6. In this position it will be noted that the lug 66 of the drive pawl is held by the hook 106 of the latch 100 and, in addition, has a portion thereof situated in a guide slot 146 of the switch housing 114. The latch arm is in engagement with the actuator 140 thereby deflecting the latch spring switch blade 132 so as to separate contacts 134 and 136. The electromagnet 120 is de-energized, and accordingly the spring 142 maintains the hooked end of the latch arm in engagement with the switch housing 114 as shown in FIG. 9. Upon energization of the electromagnet 120 the steel latch 100, which constitutes the armature of the electromagnet, is attracted to the core 126 as shown in FIGS. 8 and 10. The cam lug 108 of the latch 100 is disposed in a slot 146 in the electromagnet shell 122 and the latch arm is moved out of the plane of the switch actuator 140 whereby the inherent resiliency in the leaf spring 132 will engage contact 134 with stationary contact 136. In addition, the offset hook 106 of the latch 100 is disengaged from the lug 66 of the drive pawl as clearly seen in FIG. 8. The latch 100 remains in the position of FIGS. 8 and 10 as long as the electromagnet 120 is energized. However, upon de-energization of the electromagnet 120, the spring 142 will pivot the latch 100 and extend it outwardly into the patch of movement of the lug 66 on the drive pawl 62, as shown in FIG. 4. During movement of the latch 100 by the spring 142 when the electromagnet 120 is de-energized, the cam lug 108 forces the latch towards the switch housing 114 due to engagement of the cam lug with the lower surface of the electromagnet shell 122. The function of the cam 108 is to assure that the latch 100 will move into engagement with the switch housing 114 notwithstanding any residual magnetism in the core 126 or the latch when the electromagnet is de-energized.

Referring to FIG. 3, an energizing circuit means for the electric motor 20 will be described. The motor 20 includes a wound armature 150, one side of which is grounded and the other side of which is connected to a series field winding 152 and a shunt field winding 154. The juncture between the series and shunt field windings is connected by a wire 156 to the parking switch terminal 138 carrying stationary contact 136. The other end of the shunt field winding 154 is connected to a wire 158 having a connection with a resistor 160 and a stationary contact 162 of a first manual control switch. The movable parking switch contact 134 and its leaf spring 132 are connected by wire 164 through an automatic overload circuit breaker 166 to one terminal of a battery 168, the other terminal of which is grounded. The coil 124 of the electromagnet is connected by wire 170 to the wire 164 at one end, and the other end of the coil 124 is connected by wire 172 to stationary switch contact 174 of the first manual control switch. The wire 172 is also connected to a terminal 175a of a second manual switch 175.

The first manual control switch includes a movable bridging contact 176 having three positions, "off," "low" and "high." In the "off" position the electromagnet coil 124 is de-energized. The wiper motor is controlled by the parking switch comprising contacts 134 and 136. When the movable switch contact 176 is moved to the "low" speed position, the magnet coil 124 is energized thereby attracting the latch 100 to the core 126 so as to disengage the latch 100 from the actuator 140 and allow the parking switch to close due to the inherent resilient bias of the switch blade 132 towards the stationary contact 136. Accordingly, the motor 20 will be energized for low speed operation from the battery 168 through the overload circuit breaker 166, the wire 164, the leaf spring 132, switch contacts 134 and 136, terminal 138 and wire 156 to the series field winding 152 of the armature 150. The shunt field winding 154 is energized from the wire 156 through wire 158 and switch contacts 162 and 176, the contact 176 being grounded. When the switch contact 176 is moved to the "high" speed position, the resistor 160 is connected in series with the shunt field winding 154 to reduce the energization thereof and thus increase the speed of the motor 20. When the movable contact 176 is returned to the "off" position, the coil 124 is de-energized, but the parking switch remains closed until the crank assembly reaches its parked position whereat the latch 100 will engage the actuator 140 to separate contacts 134 and 136 and thus de-energize the motor.

With reference to FIGS. 3 through 10, a complete cycle of operation will be described starting from the parked position and returning to the parked position. When movable contact 176 of the manual switch is moved to either the "low" or "high" speed position, with the actuating mechanism in the parked position as shown in FIG. 5, the electromagnet 120 will be energized. Energization of the electromagnet 120 will attract the latch 100 and move it from the position of FIGS. 7 and 9 to the position of FIGS. 8 and 10. Accordingly, the latch 100 will be disengaged from the switch actuator 140 causing the parking switch contacts 134 and 136 to engage so as to energize the motor 20. Concurrently, the hook 106 of latch 100 will be disengaged from the lug 66 of the drive pawl 62 as shown in FIG. 8. Energization of the motor 20 will result in rotation of the worm gear 34 in the clockwise direction and during the first 180° rotation of the worm gear 34 the shaft 28 will not rotate. However, the lug 66 of the drive pawl will be withdrawn from the slot 146 in the switch housing 114 due to coaction between the follower pin 70 of the drive pawl 62 with the cam slot 82 in the worm gear. After 180° of rotation the follower pin 70 will engage its shoulder 88 and the spring 80 will pivot the lock pawl so as to engage its follower pin 76 with the shoulder 90. During the relative rotation between the shaft 28 and the worm gear 34, the axis 94 of the shaft 28 will be shifted from one side of the axis of the worm gear to the other thereby reducing the throw of the crank arm 26 to a minimum. Since the latch 100 remains substantially within the switch housing 114 as indicated by the dotted line position in FIG. 4, continued rotation of the worm gear 34 will impart rotation to the crank shaft 28 about the axis of the worm gear 34 and thus rotate the drive crank 26 so that its crank pin describes the orbit $a$.

Accordingly, the wipers driven from the crank pin 32 will oscillate throughout their normal outboard and inboard running strokes. If the manual switch contact 172 is in the low speed position, the wiper motor 20 will operate at low speed with the resistor 160 short circuited. On the other hand, if the movable switch contact 176 is moved to the high speed position, the resistor 160 will be connected in circuit with the shunt field winding 154 so as to cause the wiper motor 20 to operate at high speed.

When wiper operation is no longer required, the movable switch contact 176 is moved to the "off" position thereby de-energizing the electromagnet 120. When the electromagnet 120 is de-energized the spring 142 extends the latch 100 from the dotted line position of FIG. 4 to the full line position depicted therein. As alluded to hereinbefore, the cam lug 108 assists the spring 142 in urging the latch towards the switch housing 114 as shown in FIGS. 7 and 9 so that the offset hook 106 of the latch 100 will be in a position to intercept the end 68 of the lug 66 on the drive pawl 62 when the crank mechanism arrives at the angular position shown in FIG. 4. The motor 20 remains energized for low speed rotation when the electromagnet 120 is de-energized since the parking switch contacts 134 and 136 remain in engagement, and the high speed resistor 160 is shorted out through contacts 176 and 162 of the manual switch.

When the hook 106 of the latch engages the lug 66 of the drive pawl 62 during continued rotation of the worm gear 34, the pin 70 of the drive pawl 62 is withdrawn from engagement with the shoulder 88 thereby interrupting the driving connection between the shaft 28 and the worm gear 34. At this time rotation of the shaft 28 is substantially arrested although, as will be seen by comparing FIGS. 4 and 5, the shaft 28 does move throughout an angle of about 25° as the throw of the crank is increased to a maximum. During continued rotation of the worm gear 34 throughout 180° the axis of the shaft 28 will be moved throughout the distance 2X substantially radially from one side of the axis of the worm gear 34 to the other side of the axis thereof thereby moving the drive crank pin 32 to the position b as shown in FIG. 1. This increase in the throw of the crank assembly will be sufficient to move the wipers to depressed parked positions. When the mechanism arrives at the position shown in FIG. 5, that is during shifting of the axis of the shaft 28, it will be appreciated that the drive pawl 62 and its lug 66 will move radially outward thereby effecting inward pivotal movement of the latch 100 from the position of FIG. 4 to the position of FIG. 5. Since the latch 100 is now aligned with the switch actuator 140, the latch 100 will engage the actuator 140 to separate the parking switch contacts 136 and 134 when the crank throw is substantially a maximum so as to de-energize the motor 20 and thus arrest rotation of the worm gear 34. It is understood that during relative rotation between the worm gear 34 and the crank assembly, the follower pins on the drive pawl and the lock pawl remain in engagement with the cam slot 82 which has a configuration designed to accomodate the follower pins and in addition extend the drive pawl so as to depress the latch 100 to actuate the parking switch when the crank arm throw is substantially a maximum.

The second manual control switch 175 enables the operator of the vehicle to effect a single cycle of operation of the windshield wiper upon momentary depression of the switch. This type of operation is particularly desirable when mild percipitation conditions exist and it is not desired to continuously wipe the windshield. The second manual switch 175 includes a first stationary contact 175a connected to wire 172 and a second stationary contact 175b which is connected via a wire 181 to ground. It also includes a push button 182 carrying a bridging contact 183. The push button 182 is normally biased to the position shown in FIG. 3 by a compression spring 184 in which the bridging member 183 is disengaged from the stationary contacts 175a and 175b.

When the push button 182 is depressed the bridging contact 183 thereof will engage the stationary contacts 175a and 175b to complete a circuit for the park switch relay 120 to ground. Energization of the park switch relay 120 causes the latch 100 to be moved laterally thereof towards its third position in which it disengages the lug 66 of the drive pawl and disengages the leaf spring 132 of the park switch to allow the park switch to close which in turn effects energization of the wiper motor 20, and in the manner hereinbefore described.

In accordance with the provisions of the present invention, a latch retarding means 200 is provided to insure that the drive pawl 66 becomes disengaged from the latch 100 to enable a single revolution of the drive gear 34 to take place and thus, oscillation of the wipers through a single cycle of operation. As noted hereinbefore, when the push button switch is momentarily depressed to close the switch 175, the relay 120 is energized. This causes the latch 100 to be moved laterally to disengage the pawl 66. However, if the relay 120 were not energized for a sufficient length of time, the latch 100 would return towards its position shown in FIG. 7 upon de-energization of the relay 120. Thus, the latch 100 would move outwardly and follow the pawl 66 as the drive gear begins to rotate in a direction of the arrow. As a result of this slight outward movement of the latch 100 it remains in engagement with the pawl 66 and the frictional engagement therebetween and between the latch and the switch housing 114 is such that the latch 100 would then tend to move the pawl 66 back toward its original position it had when it was in the park position. This would in turn trip the park switch 134 and thus effect de-energization of the wiper motor 20 whereby no oscillation of the wipers would take place.

The latch retarding means 200 prevents this condition from occurring. The latch retarding means 200 is in the form of a torsion spring having one end 201 extending across the top of the park switch housing 114 and its other end 202 bent in the form of an L and which is engageable with the hook end 104 of the latch 100. The spring 200 intermediate its ends is coiled around the rivet 128. The end 201 of the spring 200 is bent downwardly as indicated at 203 and engages the lug 68 of the pawl 66.

When the mechanism is in the parked position, as shown in FIG. 6, the ends 201 and 202 of the spring 200 engage the pawl 66 and the hook end of the latch 100, respectively. When in this position the spring 200 exerts a biasing force on both the pawl 66 and the latch 100 and tends to rotate the latch 100 in a counterclockwise direction, as viewed in FIG. 6. When the park switch relay 120 is energized the latch 100 is moved laterally thereof toward its position shown in FIG. 8 in which the park switch contacts 136 and 134 are allowed to close. When the relay 120 is immediately de-energized upon release of the push button 182, the latch 100 is biased toward its second position, as shown in FIGS. 5 and 7, and tends to follow the lug 68 of the drive pawl and then to pull the lug 66 inwardly. However, since the spring 200 is biasing the latch 100 in the counterclockwise direction, it will not follow the pawl 68 and hence cannot pull the pawl 68 inwardly whereby the motor 20 will be energized for a single cycle of operation. As the lug 68 is disengaged from the latch 100, it also disengages itself from the end 201 of the spring 200. This releases the biasing force of the spring 200 and when the lug is completely disengaged from the latch 100, the spring 200 no longer has any biasing force and is in its free state. When this occurs, the spring 142 will tend to pivot the latch 100 outwardly from the switch housing 114 toward its position shown in FIG. 4 in which it will be positioned to intercept the pawl 66 as the latter approaches completion of one revolution. When this occurs, the mechanism will go into park, and in a manner hereinbefore described.

Referring to FIGS. 13–15, an alternative embodiment of a latch retarding means 210 is thereshown. The latch retarding means 210 comprises a bracket 211, which is bolted onto the switch housing 114 and which has an upstanding ear 212. The latch retarding means 210 further includes a trip member 214 which is pivotally supported at one end by an ear 212 on the bracket 211 via a pivot pin means 215. The trip member 214 has a side wall portion 214a and a top wall portion 214a, the top wall 214b being higher at its end adjacent its pivotal connection 215 than at its free end.

The trip member 214 extends between the switch housing 114 and the drive gear 34.

The trip member 214 is spring biased towards the position shown in FIGS. 13 and 15 in which it is disposed between the switch housing 114 and the drive gear 34 by a tension spring 218. The tension spring 218 has one end connected to the trip member 214 and its other end connected to an ear 219 on the bracket 211. The spring 218 tends to bias the trip member in a counterclockwise direction, as viewed in FIG. 14, or toward its position between the switch housing 114 and the drive gear 34.

When the parts are in their park position, as shown in FIG. 13, the trip member is biased by the spring 218 toward a position in which it is disposed between the switch housing 114 and the drive gear 34. When in this position it prevents outward movement of the latch member 100 towards its first position and thus, prevents the latch 100 from following the outward movement of the pawl 68 upon energization of the drive motor. Thus, even if the park switch relay 120 is momentarily energized and then de-energized, the latch member 100 is prevented from moving outwardly to pull the lug 68 on the drive pawl 66 back to the park position and thus, energization of the wiper motor for a complete cycle of operation is assured.

The trip member 214 is adapted to be tripped by the drive pawl 66 upon each revolution of the drive gear 34. To this end, as the drive pawl 66 rotates and approaches the trip member, it will engage the underside of the top 214b of the trip member and raise the same to a position in which it is not disposed between the drive gear and the switch housing. When the trip member is moved to this position, the latch member 100 is allowed to move outwardly towards its first position, as shown in FIG. 4, in which it is in a position to intercept the drive pawl 66 to disconnect the driving connection between the crank assembly 25 and the drive gear 34. As the drive pawl 66 rotates past the trip member 214 it disengages the latter and the trip member 214 is returned towards its normal position, as shown in FIG. 13 by the spring 218.

From the foregoing, it should be apparent that the use of either the latch retarding means 200 or the latch retarding means 210 provides a relatively simple and economical way to prevent outward movement of the latch member 100 upon the pawl switch relay 120 being momentarily energized and then de-energized so as to assure that a single cycle of operation of the actuating mechanism takes place. As alluded to hereinbefore, previously a separate holding coil and cam operated switch were required to prevent outward movement of the latch member 100, the latter structure being far more expensive than the latch retarding means 200 and 210.

Although the illustrated embodiments hereof have been described in great detail, it should be apparent that certain modifications, changes, and adaptations may be made in the illustrated embodiments, and that it is intended to cover all such modifications, changes and adaptations which come within the spirit of the present invention.

What is claimed is:

1. An actuating mechanism for oscillating a windshield wiper through an inboard and outboard stroke during each cycle of operation during running operation and for moving the windshield wiper to a depressed park position spaced from an inboard stroke end when wiper operation is being terminated comprising: an electric motor; energizing circuit means for the electric motor including a park switch and a momentarily depressible manual on-off switch, said park switch including an insulated switch housing having a slot, a stationary contact supported in the switch housing and a movable contact supported in the switch housing and resiliently biased into engagement with the stationary contact, a rotatable driving member connected with said motor, a variable throw crank assembly eccentrically journaled in said driving member, a coupling means for drivingly interconnecting said crank assembly and said driving member during running operation to oscillate the wipers through its inboard and outboard strokes and for disconnecting the driving connection therebetween to effect rotation of the drive member relative to the variable throw crank assembly to cause the latter to be eccentrically shifted and increase the throw of the crank assembly to move the wiper to a park position, said coupling means including a drive pawl having an upstanding lug, a latch supported on the switch housing for limited universal movement, spring means for biasing said latch to a first position for intercepting the lug on the drive pawl to effect interruption of the driving connection between the variable throw crank assembly and the driving member to substantially arrest rotation of the crank assembly whereby continued rotation of the drive member will increase the throw of the crank assembly, said drive pawl moving said latch to a second position during the increase in the throw of the crank assembly to deflect said movable contact and open the park switch to de-energize the motor when the throw of the crank assembly is substantially a maximum, relay means operable to move the latch laterally to a third position wherein it is disengaged from the lug on the drive pawl and releases said movable contact to permit closure of said park switch and hence energization of the electric motor and subsequent re-establishment of the driving connection between the pawl and the driving member, and latch retarding means engageable with said latch to retard movement of said latch toward its first position as the lug on the drive pawl is being disengaged therefrom upon the relay means being de-energized when the manual switch is released after being momentarily depressed for an instant whereby said lug on a drive pawl will not be pulled back into the park switch housing to open the park switch so as to insure energization of the wiper motor through a single cycle of operation.

2. An actuating mechanism for oscillating a windshield wiper through an inboard and outboard stroke during each cycle of operation during running operation and for moving the windshield wiper to a depressed park position spaced from an inboard stroke end when wiper operation is being terminated comprising: an electric motor; energizing circuit means for the electric motor including a park switch and a momentarily depressible manual on-off switch, said park switch including an insulated switch housing having a slot, a stationary contact supported in the switch housing and a movable contact supported in the switch housing and a movable contact supported in the switch housing and resiliently biased into engagement with the stationary contact, a rotatable driving member connected with said motor, a variable throw crank means eccentrically journaled in said driving member, a coupling means for drivingly interconnecting said crank means and said driving member during running operation to oscillate the wipers through its inboard and outboard stroke and for disconnecting the driving connection therebetween to effect rotation of the drive member relative to the variable throw crank means to cause the latter to be eccentrically shifted and increase the throw of the crank means to move the wiper to a park position, said coupling means including a drive pawl having an upstanding lug, a latch swively supported on the switch housing via a pivot means for limited universal movement, spring means for biasing said latch to a first position for intercepting the lug on the drive pawl to effect interruption of the driving connection between the variable throw crank means and the driving member to substantially arrest rotation of the crank means whereby continued rotation of the drive member will increase the throw of the crank means, said drive pawl moving said latch to a second position during the increase in the throw of the crank means to deflect said movable contact and open the park switch to de-energize the motor when the throw of the crank means is substantially a maximum, relay means operable to move the latch laterally to a third position wherein it is disengaged from the lug on the drive pawl and releases said movable contact to permit closure of said park switch and hence energization of the electric motor and subsequent re-establishment of the driving connection between the pawl and the driving member, and latch retarding means engageable with said latch to retard movement of said latch toward its first position as the lug on the drive pawl is being disengaged therefrom upon the relay means being de-energized when the manual switch is released after being momentarily depressed for an instant whereby said lug on a drive pawl will not be pulled back into the park switch housing to open the park switch so as to insure energization of the wiper motor through a single cycle of operation, said latch retarding means comprising a torsion spring encircling said pivot means and having one end which is engageable with said pawl and its other end engageable with said latch, said torsion spring biasing said latch toward its second position when in the park position and until said pawl is disengaged from the latch whereupon the biasing force of the torsion spring is relieved and said latch is allowed to move toward its first position.

3. An actuating mechanism for oscillating a windshield wiper through an inboard and outboard stroke during each cycle of operation during running operation and for moving the windshield wiper to a depressed park position spaced from an inboard stroke end when wiper operation is being terminated comprising: an electric motor; energizing circuit means for the electric motor including a park switch and a momentarily depressible manual on-off switch, said park switch including an insulated switch housing having a slot, a stationary contact supported in the switch housing and a movable contact supported in the switch housing and resiliently biased into engagement with the stationary contact, a rotatable driving member connected with said motor, a variable throw crank means eccentrically journaled in said driving member, a coupling means for drivingly interconnecting said crank means and said driving member during running operation to oscillate the wipers through its inboard and outboard stroke and for disconnecting the driving connection therebetween to effect rotation of the drive member relative to the variable throw crank means to cause the latter to be eccentrically shifted and increase the throw of the crank means to move the wiper to a park position, said coupling means including a drive pawl having an upstanding lug, a latch swively supported on the switch housing via a pivot means for limited universal movement, spring means for biasing said latch to a first position for intercepting the lug on the drive pawl to effect interruption of the driving connection between the variable throw crank means and the driving member to substantially arrest rotation of the crank means whereby continued rotation of the drive member will increase the throw of the crank means, said drive pawl moving said latch to a second position during the increase in the throw of the crank means to deflect said movable contact and open the park switch to de-energize the motor when the throw of the crank means is substantially a maximum, relay means operable to move the latch laterally to a third position wherein it is disengaged from the lug on the drive pawl and releases said movable contact to permit closure of said park switch and hence energization of the electric motor and subsequent re-establishment of the driving connection between the pawl and the driving member, and latch retarding means engageable with said latch to retard movement of said latch toward its first position as the lug on the drive pawl is being disengaged therefrom upon the relay means being de-energized when the manual switch is released after being momentarily depressed for an instant whereby said lug on a drive pawl will not be pulled back into the park switch housing to open the park switch so as to insure energization of the wiper motor through a single cycle of operation, said latch retarding means comprising a trip member pivotally supported for movement between a first position in which it is disposed between the driving member and said latch to prevent said latch from moving toward its first position and a second position in which it does not prevent said latch from moving toward its first position, said trip member being biased toward its first position and moved from its first position to its second position by said pawl prior to the latter latter reaching its position to be intercepted by said latch.

* * * * *